Feb. 18, 1964 F. V. ROSSI 3,121,300

CARTON HANDLING DEVICE

Filed Feb. 1, 1962 8 Sheets-Sheet 1

INVENTOR.
FRANCESCO V. ROSSI

BY John N. Bain

ATTORNEY

Feb. 18, 1964 F. V. ROSSI 3,121,300

CARTON HANDLING DEVICE

Filed Feb. 1, 1962 8 Sheets-Sheet 2

INVENTOR.
FRANCESCO V. ROSSI

BY John N. Ban

ATTORNEY

CARTON HANDLING DEVICE

Filed Feb. 1, 1962 8 Sheets-Sheet 3

INVENTOR.
FRANCESCO V. ROSSI

BY [signature]

ATTORNEY

CARTON HANDLING DEVICE

Filed Feb. 1, 1962 8 Sheets-Sheet 4

INVENTOR.
FRANCESCO V. ROSSI
BY John N. Bain
ATTORNEY

Feb. 18, 1964 F. V. ROSSI 3,121,300

CARTON HANDLING DEVICE

Filed Feb. 1, 1962 8 Sheets-Sheet 5

INVENTOR.
FRANCESCO V. ROSSI

BY [signature]

ATTORNEY

CARTON HANDLING DEVICE

Filed Feb. 1, 1962

INVENTOR.
FRANCESCO V. ROSSI
BY [signature]
ATTORNEY

Feb. 18, 1964 F. V. ROSSI 3,121,300
CARTON HANDLING DEVICE
Filed Feb. 1, 1962 8 Sheets-Sheet 7
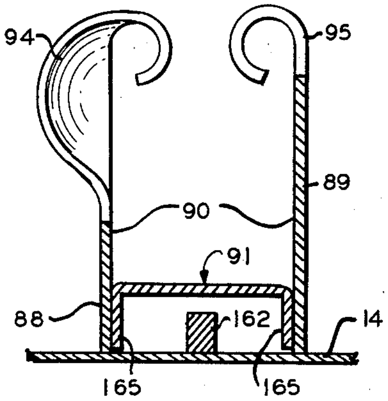
FIG. 22
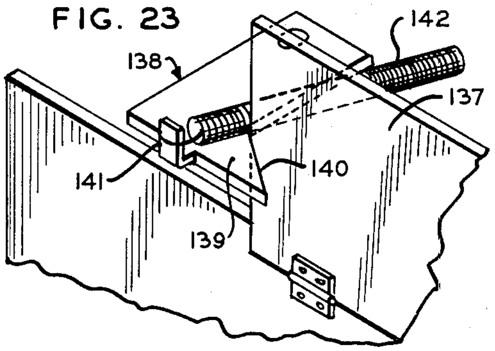
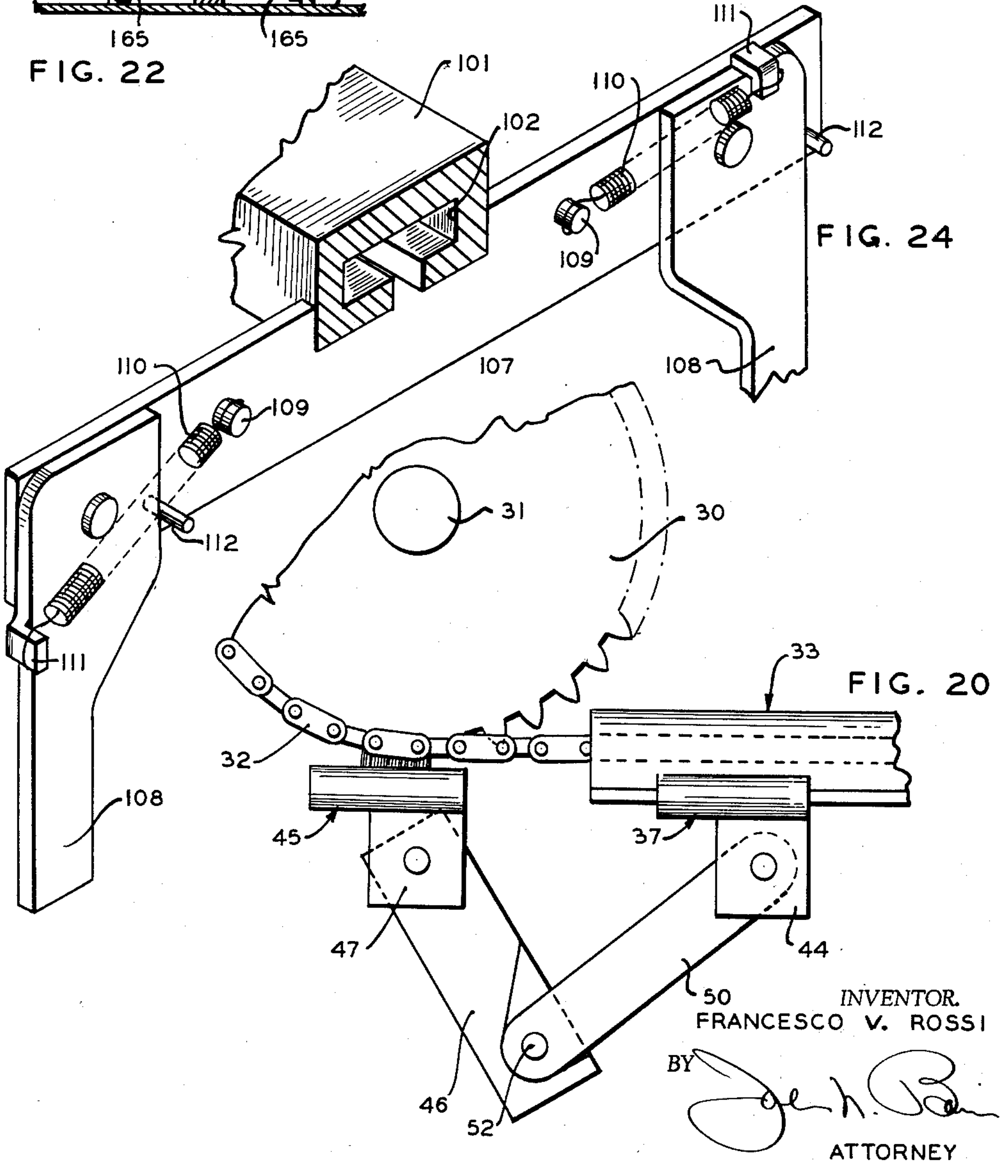
FIG. 24, FIG. 20
INVENTOR.
FRANCESCO V. ROSSI
BY
ATTORNEY Feb. 18, 1964 F. V. ROSSI 3,121,300

CARTON HANDLING DEVICE

Filed Feb. 1, 1962 8 Sheets-Sheet 8

INVENTOR.
FRANCESCO V. ROSSI

BY [signature]

ATTORNEY

United States Patent Office 3,121,300

Patented Feb. 18, 1964

3,121,300

CARTON HANDLING DEVICE

Francesco V. Rossi, 8 Crestmont Road, West Orange, N.J.

Filed Feb. 1, 1962, Ser. No. 170,483

4 Claims. (Cl. 53—50)

My invention relates to carton handling devices generally and specifically to a carton handling device adapted to transport cigarette cartons from a source of supply to a power driven feed mechanism which forces the cartons through a novel opener and detector system to a well-known stamping machine and thence through a closing and sealing mechanism to an ejector and receiver table, the entire device being electrically and mechanically integrated and operable by a single individual.

In the wholesale tobacco trade, the cigarette manufacturer provides the wholesaler with sealed cartons of cigarettes. In almost every locality, the government, either state or local, imposes a cigarette tax. The wholesaler is employed by the government as its agent to affix a tax stamp to each pack of cigarettes in the carton. Therefore, it is necessary for the wholesaler to open each carton, affix the tax stamp to the individual packs of cigarettes, and thereafter close the carton before distribution to the retailer for sale to the public.

A large number of machines have been devised to facilitate the application of the tax stamp to the individual cigarette packs. Commonly, there is employed a stamping machine and meter which is adapted to apply an inked tax stamp to the upturned end of each pack of cigarettes as they lie in the carton. Therefore, it is necessary to open the top of the carton prior to feeding it through the stamping machine. In the past, it has been necessary to employ two or more persons to feed cartons into the tax stamping machine and recover them as they are ejected therefrom. In later developments, integrated machines have been developed which provide for the automatic opening and closing of the carton. However,, in all instances, it has been necessary to employ two or more persons to operate the machine. This is unnecessarily burdensome economically and highly inefficient. In addition, existing machines have encountered a number of difficulties particularly in the opening of the carton by razor blades and knives and in other damage to the carton by the transport means employed to feed it through the opener and into the stamping machine.

Therefore, it is among the objects and advantages of my invention to provide a carton handling device which is adapted to open, stamp, close and seal at a high rate of speed, a large number of cartons, but which can be operated easily by one person.

Another object of my invention is to provide a carton handling device in which the cartons cannot be damaged by the carton transport mechanism which feeds the carton into the stamping machine.

A further object of my invention is to provide a carton handling device in which the top flaps of the carton are opened by wedge-shaped plough without the necessity for cutting or otherwise damaging the carton.

Yet another object of my invention is to provide a carton handling device which is provided with a multiplicity of integrated control mechanisms which will automatically and instantaneously shut down the operation of the transport mechanism in the event of a malfunction, thereby preventing damage to the carton and the cigarettes contained therein.

Still a further object of my invention is to provide a carton handling device in which the transport feed mechanisms adapted to introduce the cartons to the opening device and into the stamping machine and the ejector mechanism adapted to remove the cartons from the sealing apparatus after the cigarettes have been stamped, do not have to be synchronized with each other or with the stamping machine.

Yet another object of my invention is to provide a carton handling device in which the cartons are fed into the carton opening mechanism and the stamping machine by a power chain provided with a plurality of pushers which momentarily withdraw from the carton as it enters the stamping machine, thereby preventing damage to the carton by dissynchronization between the transport drive mechanism and the independently operated drive mechanism of the stamping machine.

Still another object of my invention is to provide a carton handling device which employs a rotating brush to engage the under or smaller flap of the carton in order to properly position it for engagement with a folding mechanism.

Yet a further object of my invention is to provide a carton handling device having an ejector which reciprocates periodically in response to the passage of individual cartons before it.

Still another object of my invention is to provide a carton handling device having a continuously operating conveyor belt to receive the stamped and sealed cartons and transport them to a receiving table which is integrated with detector means adapted to instantaneously and automatically shut down all feeding mechanisms in the event of a malfunction.

Yet another object of my invention is to provide a carton handling device in which both the carton opening mechanism and the carton sealing and ejector mechanism can be quickly and easily adjusted to accommodate cigarette packs of varying sizes.

Another object of my invention is to provide a carton handling device which automatically senses whether or not the carton has been properly inserted in the machine.

A still further object of my invention is to provide a carton handling device in which the transport mechanism, the carton opening and feed mechanism, the stamping machine, the carton sealing mechanism and ejector mechanism are both mechanically and electrically integrated to operate as a single unit with a multiplicity of sensing devices which will automatically and instantaneously disengage all feed mechanisms in the event of a malfunction.

These objects and advantages as well as other objects and advantages may be achieved by my invention, one embodiment of which is illustrated in the drawings in which:

FIGURE 20 is a top plan view of a portion of a sprocket upon which the drive chain for the carton feeding mechanism is engaged and the pusher mechanism at the instant the carton enters the stamping machine and is engaged by the stamping machine's independent transport drive.

FIGURE 22 is an end elevational cross-sectional view taken along lines 22—22 in FIGURE 2 looking in the direction of the arrows and showing the carton sealing mechanism.

FIGURE 23 is a view in perspective of a carton position and sensing mechanism located at the end of the ejector and adapted to automatically and instantaneously shut down the operation of the entire device in the event a carton fails to move from the ejector onto the receiving table.

FIGURE 24 is a view in perspective of the reciprocating ejector arm.

Figures 1, 8, 9:
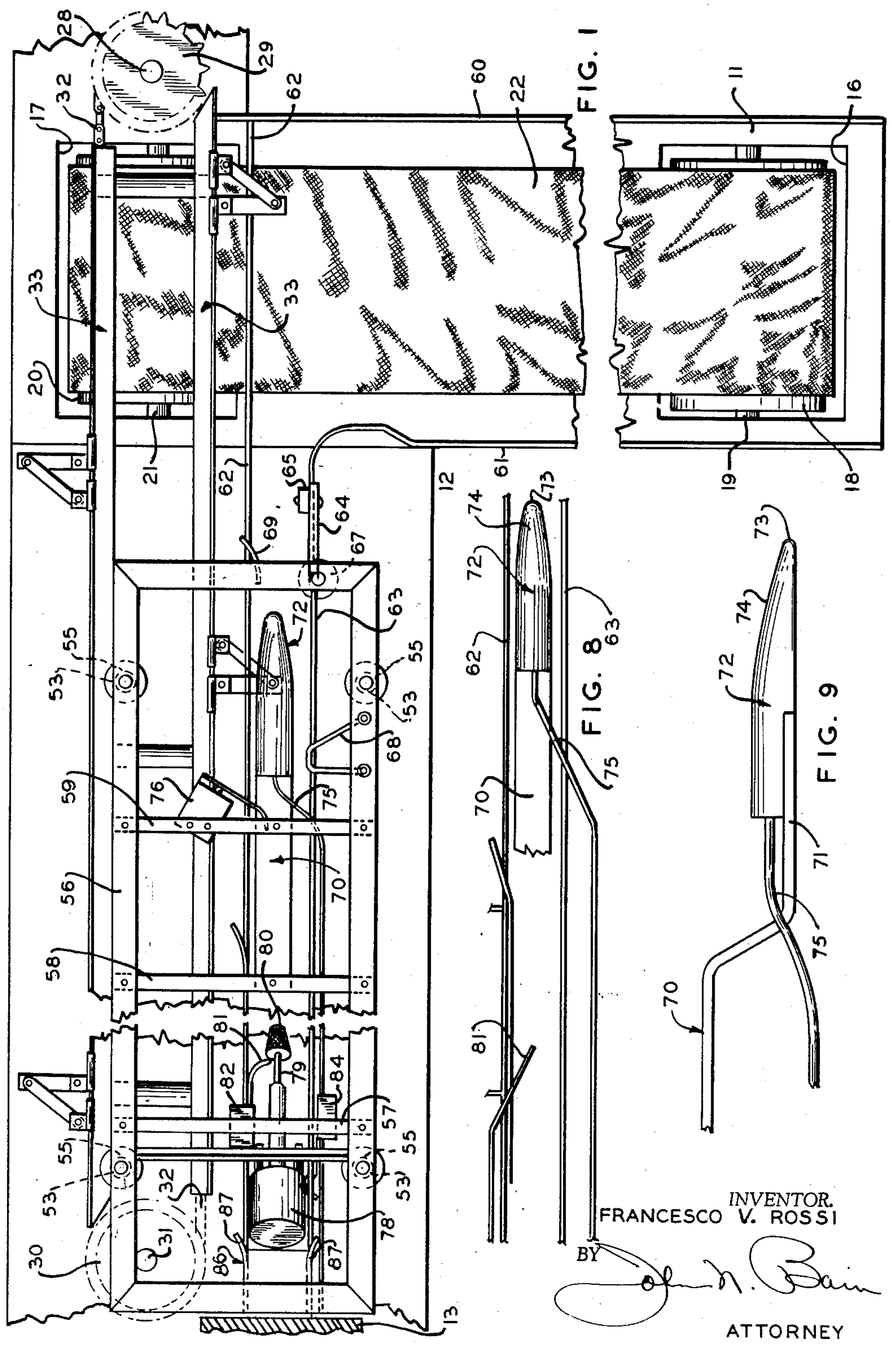
FIGURE 1 is a top plan view of a portion of my carton handling device showing a transport conveyor and the carton opening and feed mechanism.
FIGURE 8 is a top plan view, partially broken away, showing the carton opening plough and guide arms together with the carton guide flanges.
FIGURE 9 is a side elevational view showing the carton opening plough and one of the guide arms.
Figure 2:
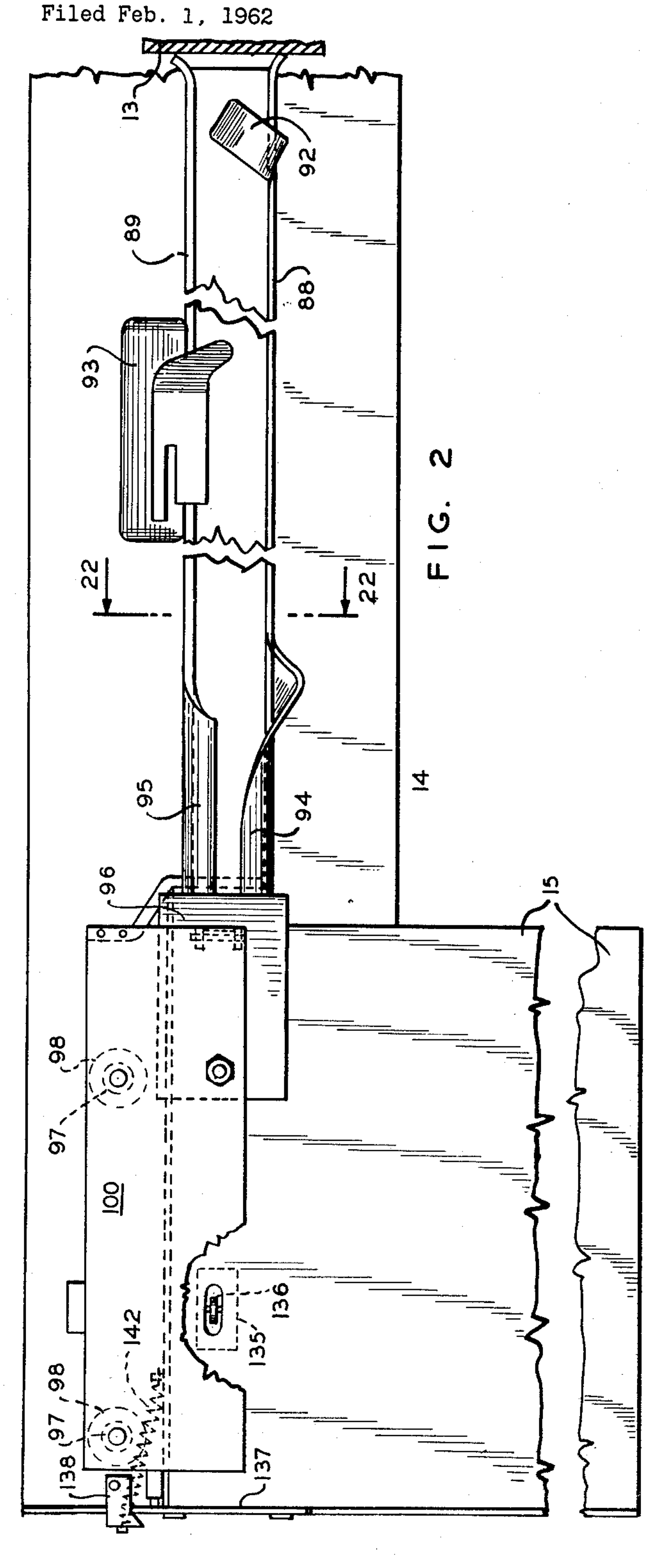
FIGURE 2 is a top plan view of a portion of my carton handling device showing the carton closure and sealing mechanism and the ejector mechanism.
Figure 4:
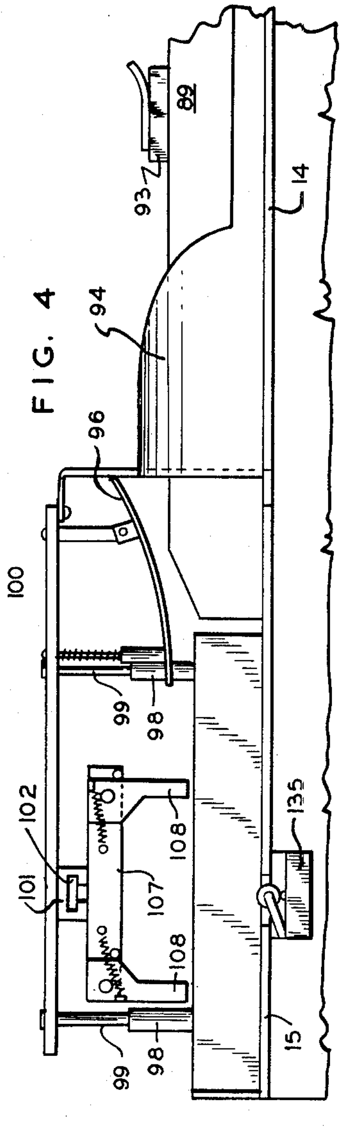
FIGURE 4 is a side elevational view of a portion of my carton handling device showing a portion of the carton closure and sealing mechanism and the ejector mechanism.

Referring now to the drawings in detail, my carton handling device is mounted on a plurality of tables approximately waist high. A supply table 11 is secured at right angles to a carton opener mechanism support table 12. The opposite end of the support table 12 is attached to an independent stamping machine 11 having its own support.

The opposite side of the stamping machine 13 is secured to a carton closure mechanism support table 14. The opposite end of the support table 14 is attached at right angles to a receiving table 15 which is generally parallel to the supply table 11. All of the respective tables are horizontal and having the same height.

The supply table 11 is provided with a rectangular opening 16 near its end opposite the carton opener support table 12. The opposite end of the supply table 11 is provided with a second rectangular opening 17. A cylindrical roller 18 is rotatably mounted on a shaft 19 beneath opening 16; the top most edge of the cylindrical roller 18 projecting upwardly through the opening 16 and slightly above the surface of the table 11. A second cylindrical roller 20 is rotatably mounted on a shaft 21 beneath opening 17; the top most edge of the cylindrical roller 20 projecting upwardly through the opening 17 slightly above the surface of the table 11. A soft, flexible conveyor belt 22 is mounted about the rollers 18 and 20 and extends immediately above the top surface of the supply table 11 and is supported thereon and extends beneath thereof.

A motor 23 is mounted beneath the supply table 11 and may be secured to a platform fixed to the legs of the table or to the floor itself. The motor 23 is coupled with a magnetic clutch and transmission 24. The transmission 24 is provided with an output power wheel 25. The shaft 21 upon which the roller 20 is mounted, is provided with a pulley 26. A drive belt 27 extends between the output power wheel 25 on the transmission 24 and the pulley 26 on shaft 21 thereby providing the means for driving the conveyor belt 22.

A vertical power output shaft 28 extends from the transmission 24 upwardly through the supply table 11. A sprocket 29 is mounted at the top of the power output shaft 28 for rotation therewith. A second sprocket 30 is rotatably mounted on a shaft 31 engaged to the support table 12 at its end opposite the sprocket 29. A drive chain 32 is mounted on the sprockets 29 and 30 and extends immediately above the surface of the support table 12. A discontinuous rail 33 is mounted to the top surface of the support table 12 between the drive sprocket 29 and the idler sprocket 30. The rail 33 is comprised of a horizontally disposed, U-shaped central portion 34, a vertical top leg 35 and a vertical bottom leg 36 lying generally in the same plane and formed integrally with the central portion 34. The rail 33 is so mounted to the support table 12 that the chain 32 passes through the U-shaped portion 34.

A carrier 37 is slidably mounted on the rail 33 and engaged to the drive chain 32. The carrier 37 has a generally rectangular, flat vertical portion 38, a pair of integral, generally horizontal, rearwardly disposed portions 39 formed integrally with the top and bottom of the vertical portion 38, and a downwardly extending top flange 40 and an upwardly extending bottom flange 41 formed integrally with the said horizontal portions 39, 39. There is thereby defined a pair of opposed, generally U-shaped channels 42, 42 adapted to engage the top leg 35 and bottom leg 36 of the rail 33, slidably securing the carrier 37 thereto. The carrier 37 is secured to the drive chain 32 by means of a pair of angled connecting rods 43, 43 having one end secured to the chain 32 and the opposite end secured to the inside of the vertical portion 38 of the carrier 37. The external surface of the vertical portion 38 is provided with a generally rectangular, horizontally disposed mounting platform 44.

A carrier 45 identical to carrier 37 is slidably mounted on 33 and is secured to the drive chain 32 in near proximity to the carrier 37. A push bar 46 is pivotally mounted to a platform 47 on the carrier 45 by means of a rivet 48. The push bar 46 is mounted on the bottom face of the platform 47. The end of the bar 46 opposite its pivot point is provided with a recess 49. A rigid connecting arm 50 is pivotally mounted to the platform 47 on carrier 37 by means of a rivet 51 and at its opposite end to the push bar 46 by means of a rivet 52.

The connecting arm 50 is mounted on the top of the push bar 46 and the bottom of the mounting platform 44, the recess 49 accommodating for the thickness of the connecting arm 50.

The carton opener support table 12 is provided with four holes 53, 53, etc. at the corners of a rectangle. A flanged, annular collar 54, 54, etc. is coaxially mounted on the table 12 immediately above the holes 53, 53, etc. A shaft, 55, 55, etc. is slidably mounted in each of the collars 54, 54, etc. and extend both above and beneath the table 12. A rectangular frame 56 is mounted across the top of the four shafts 55, 55, etc. The rectangular frame 56 is provided with a plurality of cross members, respectively 57, 58 and 59.

The supply table 11 is provided with a generally vertical, longitudinally extending outside flange 60 and a generally vertical, longitudinally extending parallel inside flange 61. The outside flange 60 intersects a vertical channel flange 62 extending at right angles to the outside flange 60 and longitudinally in the direction of the stamping machine 13. The channel flange 62 extends slightly above and over the conveyor belt 22 and is adapted to engage cartons riding thereon without interfering with the movement of the belt. The inside flange 61 bends inwardly toward the outside flange 60 in the vicinity of the table 12 and thereafter bends at right angles in the direction of the stamping machine 13. A second channel flange 63 extends from and continues the inside flange 61 in the direction of the stamping machine and is vertical and generally parallel to the channel flange 62. The channel flanges 62 and 63 are separated from each other by the width of a carton of cigarettes. Each of the channel flanges 62 and 63 as well as the front portion of the rail 33 extend beneath the rectangular frame 56. The rail 33 and the channel flanges 62 and 63 are parallel to each other.

The flange 62 is low enough to permit the push bar 46 to ride above it. The portion of the front channel flange 63 immediately adjacent to the supply table 11 is considerably higher than the flange 62 opposite it. The channel flange 63 is provided with an opening 66 in the vicinity beneath the end of the rectangular frame 56 opposite the stamping machine 13. An arm 64 is mounted on the end of the frame 56 opposite the stamping machine 13 immediately above and extending parallel to the front channel flange 63 in the direction of the conveyor belt 22. The arm 64 bends downwardly and a roller 65 is rotatably mounted at its end. A shaft 66 is mounted on the frame 56 at its end opposite the stamping machine 13 and extends downwardly and vertically along the line immediately in front of the front channel flange 63. A pressure wheel 67 is rotatably mounted on the lower end of the shaft 66. A resilient, inwardly extending arm 69 is formed integrally with the channel flange 62 opposite the pressure wheel 67 and is adapted to cooperate with the wheel 67 to compress the vertical side walls of a cigarette carton passing therebetween, causing its top flaps to bow upwardly. A generally U-shaped pressure bar 68 is mounted on the front longitudinal portion of the frame 56 and extends downwardly and inwardly to a point above and slightly to the rear of the front channel flange 63. The bar 68 is adapted to engage the ends of the cigarette packs in the carton, holding the carton in place as the top flaps are broken open. A plough mounting arm 70 is secured to the cross members 58 and 59 of the rectangular frame 56. The mounting arm 70 is bent downwardly and thereafter extends horizontally in the direction of the conveyor belt 22 to define a lower horizontal mounting end 71. A carton opening plough 72 is secured to the lower horizontal end 71 of the arm 70. The plough 72 is provided with a gently pointed tip 73 and an upwardly and rearwardly extending cam surface 74. The rectangular frame 56 to which the plough 72 is mounted, is vertically adjustable as will be hereinafter described and, therefore, the plough can be positioned such that its tip 73 is at the level of the top of a carton of cigarettes and adapted to insert itself between the bowed top flaps and the tops of the cigarette packs seated within the carton.

A curved guide arm 75 is secured to the rear end of the plough 72. The guide arm 75 bends first outwardly in the direction of the front channel flange 63 and when beyond the channel flange 63 again inwardly to extend parallel thereto in the direction of the stamping machine 13. The guide arm 75 also bends downwardly as it passes to the outside of the channel flange 63. The arm 75 is adapted to engage the larger flap of the carton as it travels along the plough 72 lifting it first to a vertical position and then bending it over to an outwardly and downwardly extending position.

A micro-switch 76 is mounted on the cross member 59 of the rectangular frame 56. The control arm 77 of the micro-switch 76 extends into the channel defined by the flanges 62 and 63. The control arm 77 is positioned in such a height as to engage only the larger of the top flaps of the carton and not the smaller flap. In the event that the carton has been placed on the conveyor belt 22 in an inverted or reverse position, the larger flap will be adjacent to the rear channel flange 62 and will engage the control arm 77 of micro-switch 76. Micro-switch 76 will then instantaneously trip the magnetic clutch in the transmission 24 bringing the transport feed mechanism to an instantaeous and automatic stop.

A small electric motor 78 is mounted on the cross member 57 of the rectangular frame 56. The motor 78 is provided with a rotatable power output shaft 79 extending outwardly in the direction of the plough 72 and downwardly to a level near the top of a carton seated within the channel. The end of the shaft 79 is provided with a generally conical brush 80 which is adapted to engage the smaller of the top flaps of the carton as it passes therebeneath. A second curved guide arm 81 is located immediately to the rear of the brush 80 on the side nearest the stamping machine 13. The curved arm 81 bends outwardly toward the rear channel flange 62 and then curves inwardly to extend parallel to the flange 62 in the direction of the stamping machine 13. The guide arm 81 may be conveniently mounted on cross members 57 and 58 of the rectangular frame 56.

A second micro-switch 82 is mounted on the cross member 57 of the rectangular frame 56 and is provided with a control arm 83 which is adapted to engage the smaller of the top flaps of the carton only if it is engaged by the curved guide arm 81. A third micro-switch 84 is mounted on the support table 12 and is provided with a control arm 85 which extends through the front channel flange 63 to engage the side of the carton sliding between the flanges 62 and 63 and passing the switch arm 85.

A generally U-shaped guide 86 is mounted on the end of the frame 56 immediately adjacent to the stamping machine 13. The U-shaped guide 86 is provided with a pair of opposed and outwardly flaring side walls 87, 87 on the side opposite the stamping machine 13. The end of the guide 86 adjacent to the stamping machine 13 is adapted to feed each carton directly into the intake throat of the stamping machine.

A pair of generally parallel, vertical flanges 88 and 89 are mounted on the carton closure support table 14 and extend from the upward throat of the stamping machine 13 toward the ejector mechanism. The flanges 88 and 89 define a channel 90 through which the cartons pass. The channel 90 is provided with an inverted, generally U-shaped floor 91 which is vertically adjustable to accommodate for cartons of different vertical heights.

The flange 88 is provided with a cammed tab 92. The cammed tab 92 is secured to the top edge of the flange 88 and is adapted to engage and lift upwardly to a generally upwardly and inwardly disposed position, the larger of the top flaps of the carton. A well-known glue dispensing apparatus 93 is secured to the opposite flange 89 and is adapted to coat the upper surface of the smaller top flap on the carton with glue. The channel 90 is then provided with a well-known closure apparatus comprising a pair of opposed cammed surfaces 94 and 95 followed by a downwardly curved hand press 96. The surfaces 94 and 95 fold the smaller flap and then the larger flap against each other and the press 96, which is spring-loaded, firmly secures them together.

The receiving table 15 is provided with a pair of holes 97, 97 at its end nearest the carton closure support table 14. A flanged, annular collar 98 is mounted on the top of the receiving table 15 coaxially with each of the holes 97, 97. A shaft 99 is slidably mounted within each of the collar 98, 98 and extends both above and beneath the receiving table 15. A generally horizontal platform 100 is mounted across the tops of shafts 99, 99. A guide 101 is mounted transversely across the bottom of the platform 100 and is generally parallel to the axis of the receiving table 15. The guide 101 is provided with a longitudinal, T-shaped channel 102. An elongated slide bar 103 is slidably seated within the T-shaped channel 102. The slide bar, 103, which has a generally rectangular cross-sectional configuration, is provided with an integral, downwardly extending, generally vertical mounts 104, 104 separated from each other to define a receiving slot. The mounts 104 extend through the T-shaped channel 102 in the guide 101 and are pivotally mounted to reciprocating drive arm 105. The drive arm 105 extends downwardly through the receiving table 15 and is operatively connected to a source of power which will be hereinafter described more fully.

The opposite end of the slide 103 is provided with an integral downwardly extending leg 106 which is connected to a cross arm 107. The cross arm 107 is provided with a central recess adapted to accommodate the guide 101 and the cross bar is, therefore, slidably mounted thereon. A pair of downwardly extending arms 108, 108 are pivotally mounted to the opposite ends of the cross arm 107. The cross arm 107 is also provided with a pair of mounting posts 109, 109 for securing one end of a spring 110, 110 to the cross armr 107. The opposite end of each spring 110, is mounted to an extension 111 on each of the respective arms 108, 108. The extension 111 on the arm 108 nearest the stamping machine 13 is located at its top and above its pivot point. The extension 111 on the opposite arm 108 is located on its far side and beneath the pivot point. Thus, each of the arms 108, 108 is able to rotate clockwise in opposition to the normal urging of the respective springs 110, 110. Appropriate stops 112, 112 are provided on the cross arm 107 to prevent rotation of the arms 108, 108 in a counterclockwise direction past the vertical.

A motor 113 is mounted on a shelf 114 rotated beneath the receiving table 15. A power reduction pulley 115 is mounted on the shelf 114 and is coupled to the motor by a drive belt 116. The power reduction pulley 115 is connected to a drive pulley 117 through a belt 118. The drive pulley 117 is mounted on a generally horizontal shaft 119. The opposite side of the drive pulley 117 is provided with a connecting shaft 120 coupled with a dog clutch 121. A power output shaft 122 is mounted opposite the dog clutch 121 and is generally coaxial with the shaft 119. The end of the shaft 122 opposite the dog clutch 121 is provided with a disc 123 which is adapted to rotate with it. A control arm 124 is pivotally mounted on the disc 123 near its periphery. The control arm 124 is provided with a transverse pin 125 which extends perpendicularly thereto in the direction of the dog clutch 121. The pin 125 extends to a position slightly beyond the plane of the dog clutch 121 and the opposite end of the pin 125 extends in the opposite direction beyond the disc 123 and is connected to a spring 126 which extends between it and the power output shaft 122. The spring 126 will not rotate with the shaft 122 by means of its mounting which may be a collar, a bearing or some other suitable means. The disc 123 is also provided with a peripheral, V-shaped cut 127 adapted to accommodate the pin 125 when urged toward counterclockwise rotation by the spring 126. The end of the arm 124 opposite its mount is provided with a V-shaped cut 128 adapted to accommodate a reciprocating control pin 129. The opposite end of the control pin 129 is secured to the end of an armature of a solenoid 130. A spring 131 is secured to the arm 129 intermediate its ends. The other end of the spring 139 is engaged to a housing 132 and is adapted to urge the control arm outwardly. The end of the output shaft 121 opposite the disc 123 is provided with an offset pin 133. A connecting rod 134 is pivotally mounted on the pin 133 and extends to and is pivotally mounted to the reciprocating drive arm 105. The bottom end of the reciprocating drive arm 105 is pivotally mounted on the shelf 114 and its top end is pivotally mounted to the mounts 104, 104 secured to the slide 103.

Figures 25, 26, 27, 28:
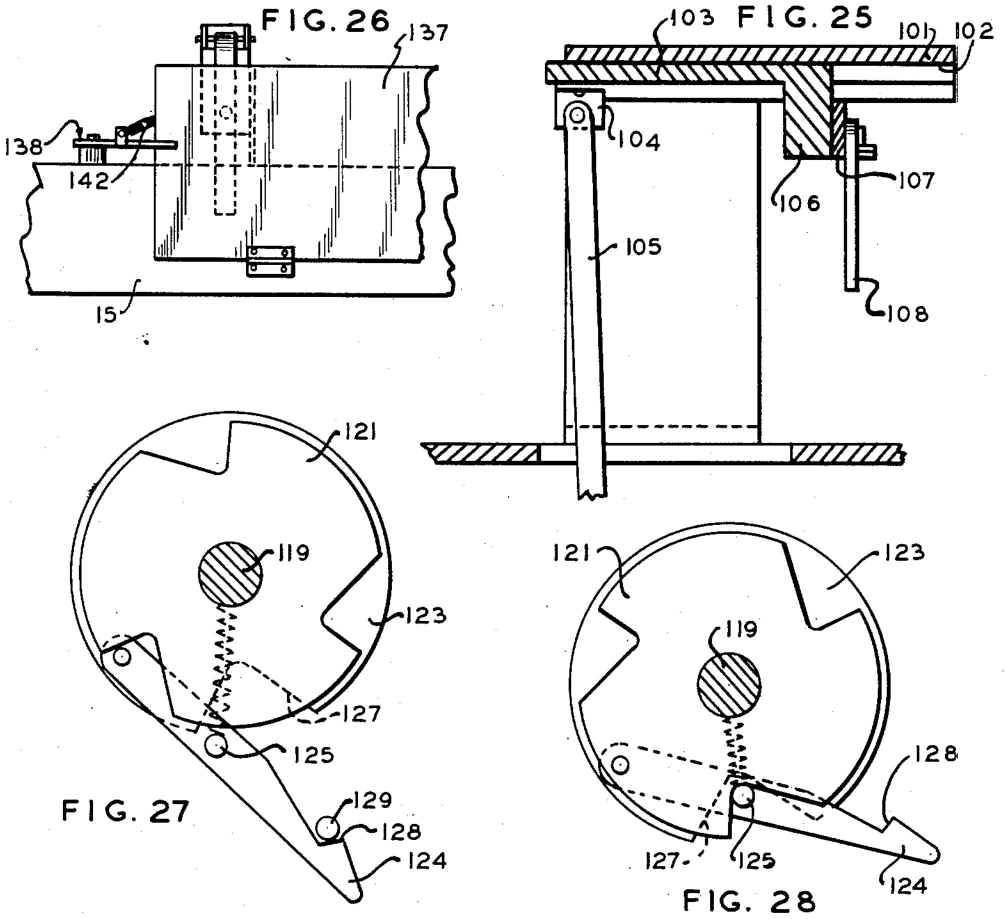
FIGURE 25 is a side elevational, cross-sectional view of the reciprocating ejector arm and its drive mechanism.
FIGURE 26 is an end elevational view showing the carton position and sensing mechanism shown in FIGURE 23 and a micro-switch detector integrated therewith.
FIGURE 27 is an end elevational view taken along lines 27—27 in FIGURE 7 looking in the direction of the arrows and showing a dog clutch and a spring-loaded control arm.
FIGURE 28 is an end elevational view of the dog clutch shown in FIGURE 27 with the control arm in an engaged position.
Figure 3:
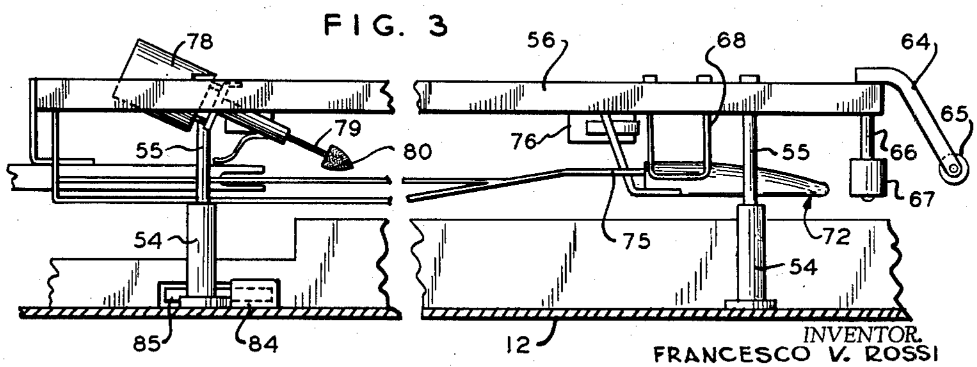
FIGURE 3 is a side elevational view of a portion of my carton handling device showing the carton opening mechanism.

A micro-switch 135 is mounted on the bottom of the receiving table 15 in the path of movement of the cartons being ejected from the channel 90. The control arm of the micro-switch 135 projects upwardly through an opening 136 in the table 15 to engage the bottom of each carton. The edge of the receiving table 15 opposite the stamping machine 13 is provided with a generally vertical, hinged wall 137 which is adapted to fold outwardly. A spring-loaded lever 138, is pivotally mounted to the receiving table 15. The control lever 138 is provided with a triangular extension 139 having a cammed surface 140 engaged to the wall 137. The lever 138 is also provided with a spring mounting arm 141 to which a spring 142 is mounted. The opposite end of the spring 142 is engaged to the receiving table 115 and normally urges the lever 138 to pivot in a counterclockwise direction, forcing the cammed surface 142 against the hinged vertical wall 137, maintaining it in a vertical position. A micro-switch 143, shown more clearly in FIGURE 26, is mounted to the table 15 adjacent to the hinged wall 137 with its control arm sandwiched between the wall 137 and the edge of the table 15.

Figure 29:
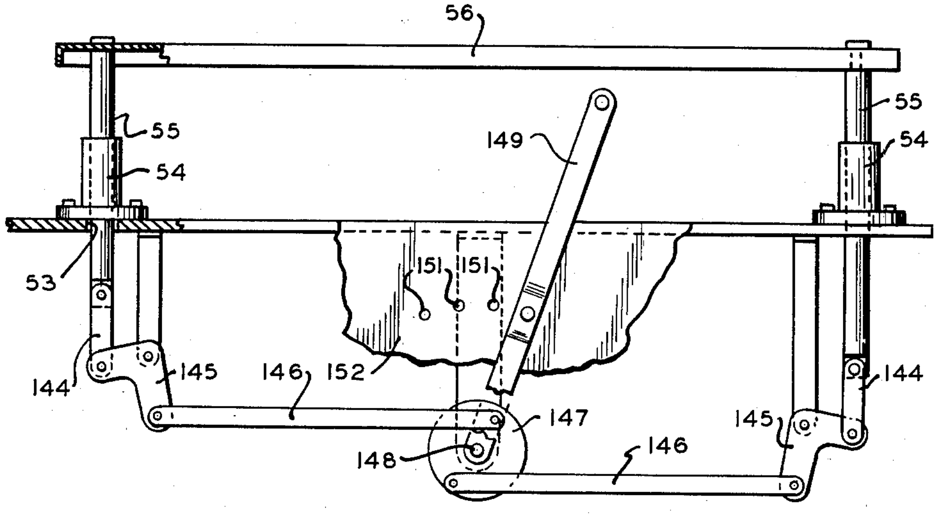
FIGURE 29 is a rear elevational view of the adjustment mechanism upon which the carton opening and sensing mechanism is mounted.
Figure 31:
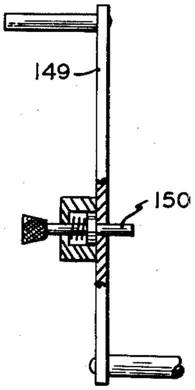
FIGURE 31 is an end elevational, partial cross-sectional view of a control handle employed to operate either of the adjustment mechanisms shown in FIGURES 29 and 30.
Figure 30:
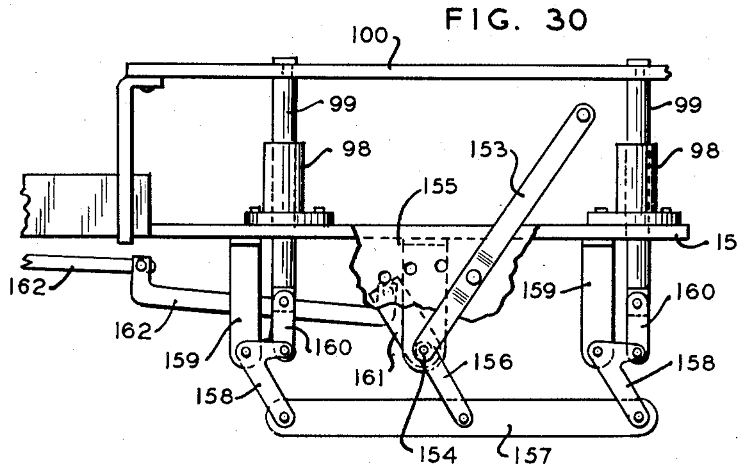
FIGURE 30 is a rear elevational view of the adjustment mechanism upon which the ejector is mounted.
Figure 32:
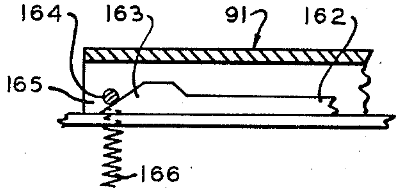
FIGURE 32 is a rear elevational, cross-sectional view of a portion of the carton guide immediately preceding the closing mechanism together with the means adapted to effect the vertical adjustment thereof.

As mentioned herein earlier, the carton opening mechanism and the carton closure mechanism are each vertically adjustable as is the carton ejector mechanism. FIGURE 29 shows the mechanism by which the carton opening device is adjusted vertically. The bottom of the shaft 55, 55, etc. are pivotally mounted to a straight connecting arm 144, 144, etc. The opposite end of each of the connecting arms, 144, 144, etc. is pivotally engaged to an L-shaped, pivotal connecting arm 145, 145, etc. The L-shaped arm 145, 145, is pivotally connected to a support mounted on the table 12. The opposite leg of each of the L-shaped connecting arms 145, 145, etc. is pivotally connected to an elongated connecting rod 146, 146, etc. The opposite end of each of the connecting rods 146, 146, etc. is pivotally connected to the periphery of a rotatable disc 147, mounted on a shaft 148. Also mounted on the shaft 148 is a control arm 149 adapted to rotate the shaft 148. Intermediate the ends of the control arm 149 is a spring-loaded pin 150 adapted to seat within a plurality of holes 151 in a suitable plate 152 secured to the carton opener support table 12.

Similarly, there is provided a control arm 153 pivotally mounted on a shaft 154 rotatably engaged to a structure member 155 on the receiving table 15. Also mounted on the shaft 154 in a fixed angular relationship to the control arm 153 is a connecting arm 156. The opposite end of the connecting arm 156 is pivotally mounted to a generally horizontal cross member 157. The opposite ends of the cross member 157 are pivotally engaged to an angular connecting member 158. The apex of each of the angular connecting members is pivotally mounted on a structural member 159 engaged to the receiving table 15. The leg on each of the angular connecting members 158 opposite the leg connected to the cross member 157 is pivotally connected to a pivotal arm 160. The opposite end of each of the connecting arms 160 is pivotally secured to the bottom end of the shafts 99, 99.

The shaft 154 is also provided with a second control arm 161 secured thereto in a fixed angular relationship to the control arm 153. The opposite end of the control arm 161 is pivotally connected to a U-shaped connecting rod 162 which is in itself pivotally connected to a push bar 163. The push rod 162 extends along the top of the support table 14 beneath the U-shaped platform 91 seated between the channel 90 defined by flanges 88 and 89. The end of the push rod 162 is provided with a cammed surface 163. A transverse pin 164 extends across the vertical side walls 165, 165 of the platform 91 and is positioned to ride on the cammed surface 163. A spring 166 is also secured to the transverse pin 164 and extends downwardly through the support table 14 and is secured to a convenient structural member thereunder. The spring 166 is adapted to urge the pin 164 into continuous engagement with the cammed surface 163.

Figures 5, 6, 7:
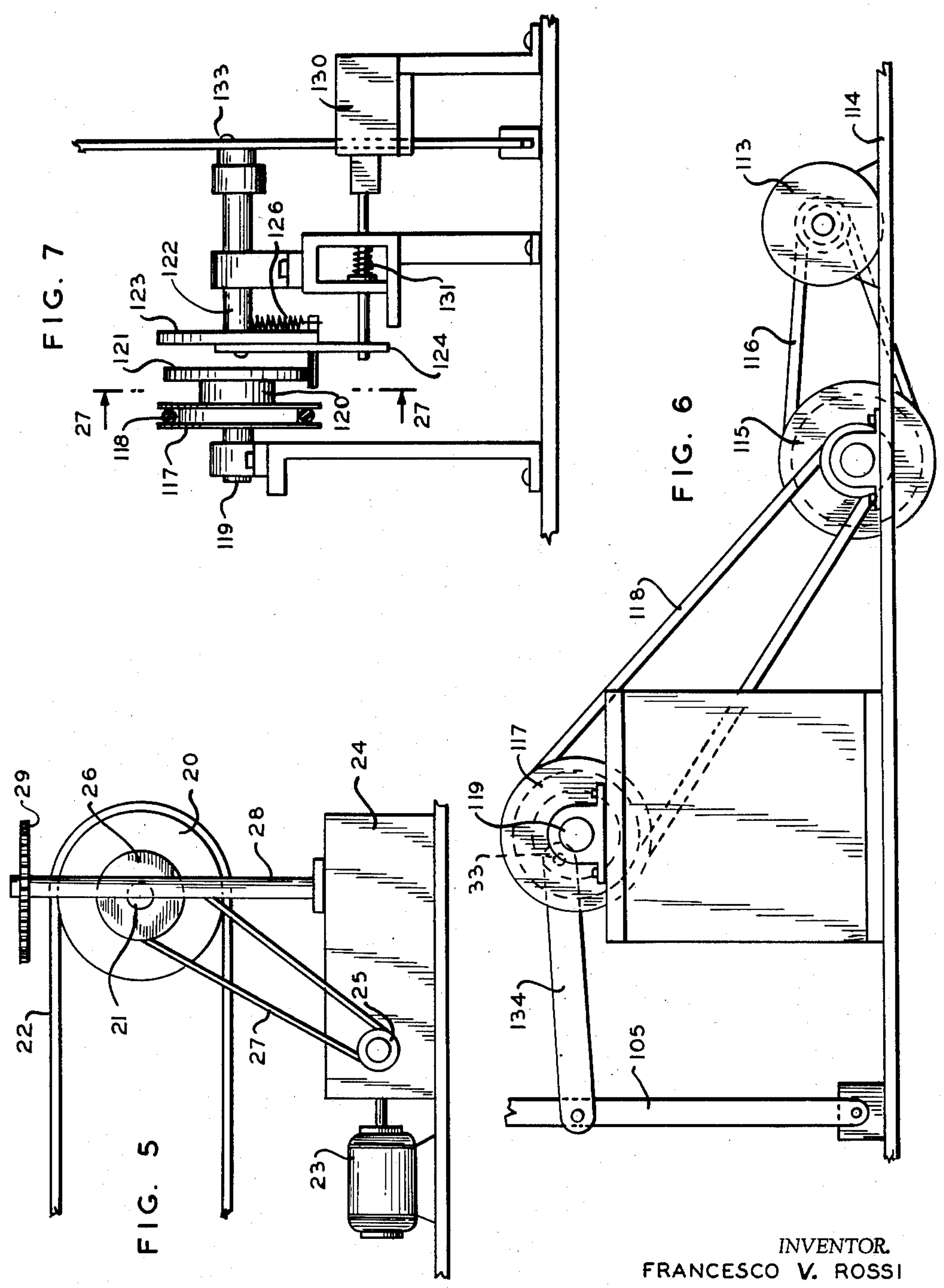
FIGURE 5 is an end elevational view of a portion of the transport conveyor and the driving and transmission means for the carton conveyor and feed mechanism.
FIGURE 6 is an end elevational view of the ejector drive mechanism.
FIGURE 7 is a side elevational view of the ejector drive and clutch mechanism.
Figure 10:
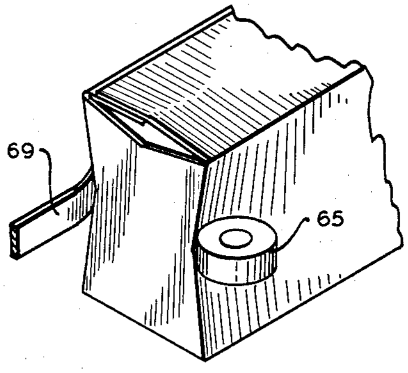
FIGURE 10 is a view in perspective showing a carton entering the first phase of the carton opening mechanism wherein its vertical side walls are compressed inwardly to bow its top flaps upwardly.
Figure 11:
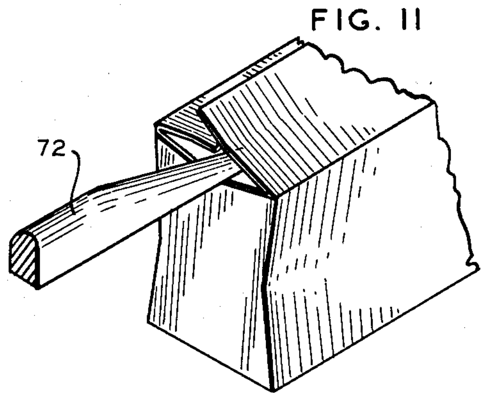
FIGURE 11 is a view in perspective showing the carton in the next phase of the carton opening mechanism where its top flaps are engaging the plough.

In an alternative structure, a conveyor belt may be substituted for the ejector mechanism shown in FIGURES 6, 7, 24, 25, 27 and 28. The power train as shown in FIGURE 6 may be the same through pulley 117 which may be connected to one of the cylinders about which the conveyor rides. The conveyor will operate continuously carrying each carton as it is deposited thereon from the end of the channel 90 outwardly onto the supply table. In order that the cartons not be caused to engage the continuously moving conveyor before they are discharged from the channel 90, the channel 90 is maintained slightly above the level of the conveyor belt. The pressure cam 96 will hold the carton in engagement with the support table 14 under the channel 90 until it drops onto the conveyor.

In operation, the carton opening and detector mechanism and the ejector and closure mechanisms are adjusted by means of levers 149 and 153 to the proper height to accommodate the particular size of cigarettes to be processed. In the case of the carton opening mechanism the pin 150 is pulled outwardly so that the control arm 149 may be pivoted. Rotation of the shaft 148 is translated into vertical movement of the shafts 55, 55 supporting the frame 56 upon which the various mechanisms are mounted.

Similarly, rotation of arm 153 about shaft 154 is translated into vertical movement of the shafts 99, 99 supporting the platform 100 upon which the ejector mechanism is mounted. Simultaneously, rotation of shaft 154 is translated into horizontal movement of the push rod 162 which forces the cammed surface 163 against the pin 164, thus, raising and lowering the platform 91.

Cartons are first placed on the supply table 11 with their long dimension generally perpendicular to the path of movement of the conveyor belt 22. The cartons are oriented such that the larger of the top flaps is nearer the front of the apparatus. The apparatus is then energized so that the conveyor belt 22, the drive chain 32 and the motor 78 operate. The cartons are fed by the conveyor belt 22 to the rear flange 62 where they momentarily come to rest awaiting the push bar 46 carried by the chain 33. The push bar 46 riding on the carrier 45 and connected to the carrier 37 engages the end of the carton carrying it toward the carton opener mechanism. The top of the carton is first engaged by the roller 65 mounted on the frame 56. It is next engaged by the roller 67 and the resilient arm 69, compressing its vertical side walls inwardly toward each other. This causes the top flaps to bow upwardly creating an open space into which the tip of the plough 72 may enter. As the push bar 46 continues to propel the carton toward the plough 72, the top flaps are forced upwardly and apart by the cammed surface 74, breaking the glue seals without damage to the flaps. The roller 65 helps hold the carton down against the table 12 during this procedure.

Figure 12:
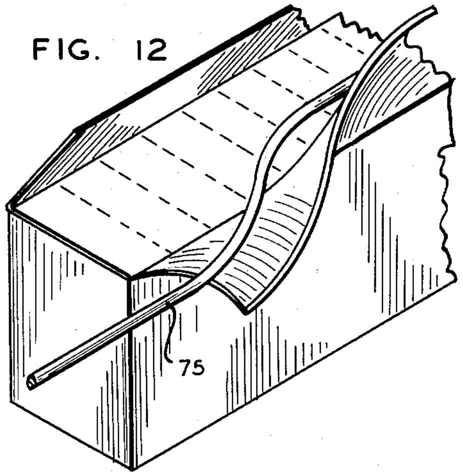
FIGURE 12 is a view in perspective showing the carton in the next phase of the carton opening mechanism wherein the larger top flap of the carton is forced outwardly and downwardly by the guide arm.
Figure 13:
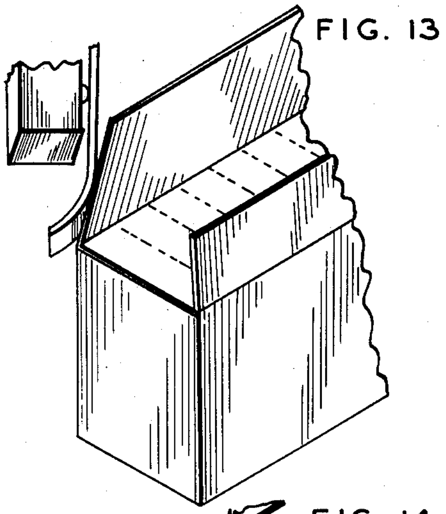
FIGURE 13 is a view in perspective showing the carton in a phase substantially identical to that shown in FIGURE 12 wherein a detector is adapted to sense the position of the carton, shutting down the mechanism should the carton have been fed into the machine in other than a proper position.

The larger of the top flaps of the carton should face the front of the table 12. It is lifted upwardly by the plough and engages the curved guide arm 75 secured to the rear of the plough which lifts it first upwardly then outwardly and then downwardly as is shown in FIGURE 12. Should the carton be facing the wrong way, the larger flap will face the rear of the table 12 and will engage the control arm of the micro-switch 76 as is shown in FIGURE 13. The micro-switch 76 is so connected in the electrical circuitry of the entire apparatus as to instantaneously and automatically disengage the magnetic clutch in the transmission 24 instantaneously stopping the chain 32 bringing the carton to an immediate halt.

Figures 14, 15:
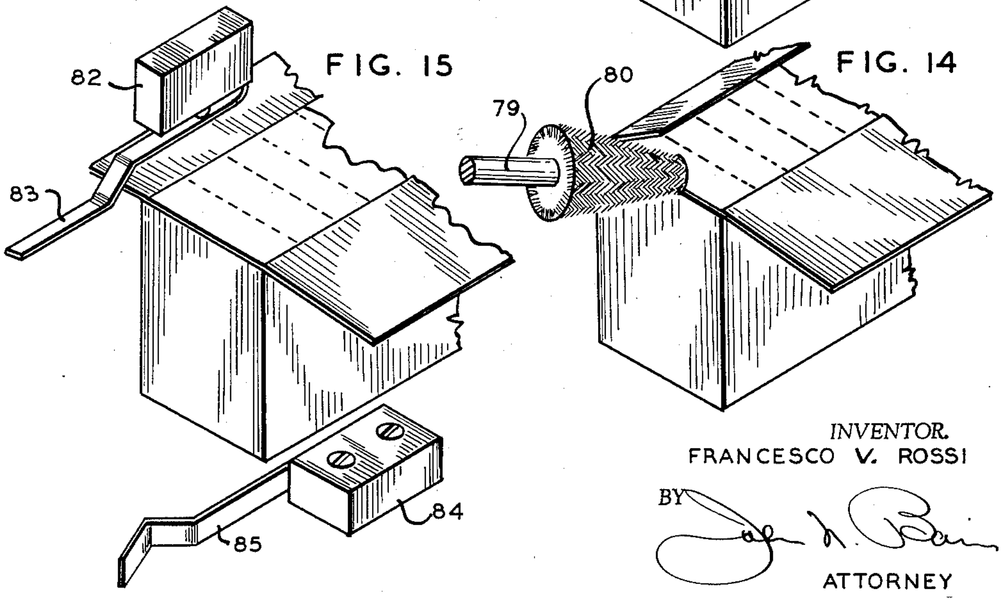
FIGURE 14 is a view in perspective showing the carton in the next phase of the carton opening mechanism wherein a rotating brush engages the smaller of the top flaps to stand it vertically to engage another guide arm.
FIGURE 15 is a view in perspective showing the carton as it passes a pair of detectors adapted to sense whether or not the top flaps are in proper position for introduction into a U-shaped guide for feeding into the stamping machine.
Figures 16, 17, 18:
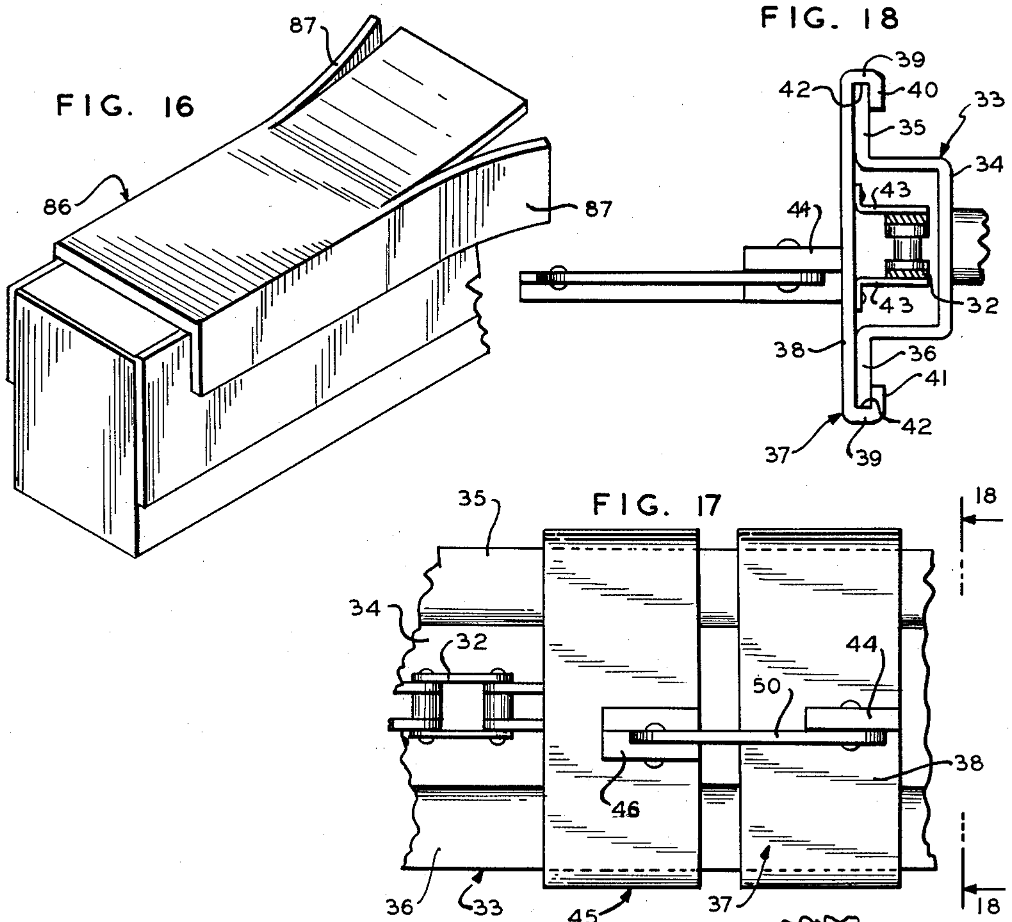
FIGURE 16 is a view in perspective showing a carton passing through a U-shaped guide immediately before entering the stamping machine.
FIGURE 17 is a side elevational view of a portion of the chain driven carton feed mechanism showing the carton pusher.
FIGURE 18 is an end elevational view taken along line 18—18 in FIGURE 17 showing the chain drive, a longitudinal rail and the pusher mechanism.
Figure 19:
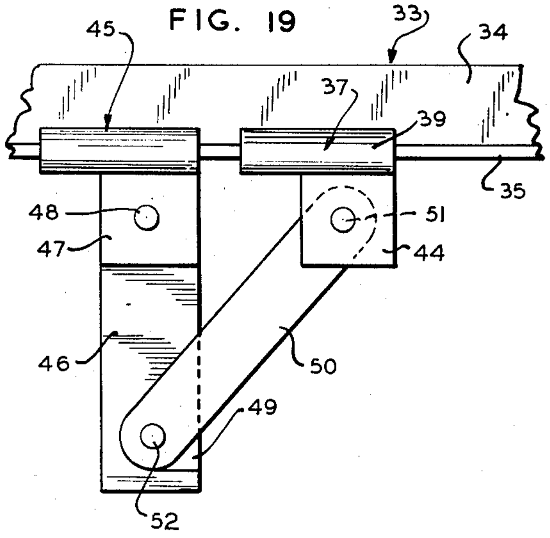
FIGURE 19 is a top plan view of the chain driven carton feed shown in FIGURES 17 and 18.
Figure 21:
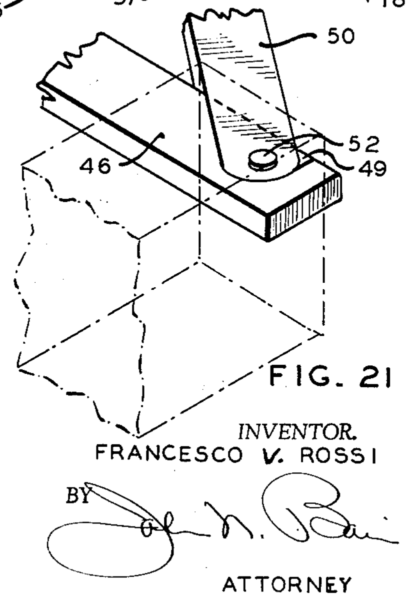
FIGURE 21 is a view in perspective showing the carton in broken lines and the pusher mechanism engaged thereto.

If all is in order, the carton will proceed further down the channel defined by the flanges 62 and 63 to the rotating brush 80. The brush 80 rotates in such a direction as to engage and lift the smaller of the top flaps of the carton as is shown in FIGURE 14 presenting it to be engaged by the curved guide arm 81. The curved guide arm 81 lifts the smaller flap first upwardly and then outwardly and downwardly as does the guide arm 75 with the larger of the two flaps. As the carton proceeds further, the smaller of the top flaps will first engage the control arm 83 of a micro-switch 82 causing its contacts to close. Immediately thereafter, the lower opposite side of the carton will engage the control arm 85 of the micro-switch 84. The circuitry of the apparatus is arranged in any convenient manner such that if the micro-switch 84 closes contact while the micro-switch 82 is still open, the magnetic clutch in the transmission 24 will be instantaneously and automatically disengaged bringing the carton to a halt. Thus, the combination of micro-switches 82 and 84 detect whether or not the flaps of the carton are properly oriented for introduction into the U-shaped guide 86. The flared side walls 87, 87 of the guide 86 engage the top flaps of the carton folding them downwardly to lie parallel to the side walls thereof as shown in FIGURE 16 for introduction into the throat of the stamping machine.

One novel aspect of my invention resides in the mechanism carried by the chain 32 which propels the cartons. It has been found in the past that the pushing mechanism frequently damaged the carton as it entered the throat of the stamping machine and engaged the independent drive mechanism of the stamping machine. Unless the drive mechanism of the stamping machine were precisely synchronized with the pushing mechanism of the carton, dissynchronization would cause the pushing mechanism to crease or cut the end of the carton. In my pushing mechanism, the push bar 46 momentarily withdraws away from the carton as it enters the throat of the stamping machine and engages the drive mechanism thereof. This is accomplished by the cross linkage between the push bar 46 and the carrier 37 as is shown in FIGURE 20. This momentary withdrawal occurs as the pivot point of the rivet 48 passes a line perpendicular to the carrier 45 and passing through the center of rotation of the sprocket 30. As the push bar 46 withdraws away from the carton, the independent drive mechanism of the stamping machine picks it up carrying it through the stamping machine without damage to the carton. There is also an independent malfunction detector mechanism in the stamping machine which is well-known which is connected to the circuitry controlling the magnetic clutch in the transmission 24 such that a malfunction in the stamping machine will cause an instantaueous and automatic shutdown of the drive chain and conveyor belt.

As the carton leaves the stamping machine, it passes into the channel 90 defined by flanges 88 and 89. The larger of the top flaps engages the cam 92 lifting it from a position parallel to the side of the carton to a position pitched at an angle inwardly towards the top of the carton. The power for propelling the carton at this point is provided by the movement of subsequent cartons passing through the stamping machine, one being forced against the other for motion of the line of cartons. Thereafter, the smaller flap of the carton is engaged by the glueing mechanism 93 which is well-known and which applies glue thereto. The top flap then engages the cam 94 and the smaller flap engages the cam 95 folding the larger flap over the smaller flap. Thereafter, the top flaps are engaged with the cam press 96 forcing them downwardly together and causing the glue to stick.

The carton then moves onto the receiving table 15 and then engages the micro-switch 36 which trips the solenoid 130 in the ejector drive mechanism. The solenoid withdraws the pin 129 permitting the spring 126 to pull the control arm 124 upwardly. The pin 125 on the control arm 124 will engage the periphery of the dog clutch 121 until it encounters a recess into which it will fall as shown in FIGURE 28. The disc 123 is also provided with a recess 127 to accommodate the pin as the control arm rises. The dog clutch is then engaged to the disc 123 and will rotate it through one revolution until the control arm 24 again engages the pin 129 on the end of the armature of the solenoid 130. Continued rotation of the dog clutch 121 will cause the pin 125 to ride up on its recess and disengage the disc 123 from the dog clutch 121. As the disc 123 rotates through one revolution, the pin 133 on the opposite side of the shaft 122 rotates through one revolution. Since the pin 133 is eccentric to the shaft 122, it will cause the connecting arm 134 to reciprocate. This motion is translated to the arm 105 which carries the slide 103 in the guide 101. The slide 103 translated this reciprocating motion to the cross arm 107 and the arms 108, 108 which push the carton forwardly on the receiving table 15. Power for the ejector mechanism is supplied by the motor 113 which is coupled to a connecting pulley 116 and the drive pulley 117 which propels the dog clutch 121.

In the event of a malfunction of the ejector mechanism such that the carton does not move forwardly on the table 15, the succeeding carton will force it into the hinged wall 137 forcing it outwardly against the cammed surface 140 of the control lever 138 against the urging of the spring 142. The micro-switch 143 with its control arm sandwiched between the wall 137 and the edge of the table 15 will open when the wall 137 falls outwardly. The micro-switch 143 will then automatically and instantaneously disengage the magnetic clutch in the transmission 24 shutting down the operation of the conveyor belt 22 and the chain 32 as well as the drive mechanism of the stamping machine 13. Thus, the cartons do not proceed further. Should there be a misfunction in the reciprocating arm mechanism of the ejector and the cartons continue to move laterally onto the receiving table 15 from the channel 90, the arms 108, 108 will simply pivot in a clockwise direction against the urging of the springs 110, 110 and, therefore, cause no damage to the carton.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A carton handling device comprising,
(*a*) a first power source,
(*b*) a transmission connected to the first power source,
(*c*) an electrically controlled clutch in the transmission adapted to instantaneously disengage the transmission from the first power source,
(*d*) a carton transport means driven through the transmission,
(*e*) carton drive means driven through the transmission, the carton drive means positioned in carton intercepting relationship to the carton transport means,
(*f*) a generally horizontal, vertically adjustable frame mounted over the carton drive means,
(*g*) means for inwardly compressing the side walls of each carton as it is carried by the carton drive means,
(*h*) carton opening means mounted on the frame extending downwardly into the path of movement of the cartons carried by the carton drive means and adapted to separate the two top flaps of each carton,
(*i*) a first electro-mechanical detection and switch means mounted on the frame adapted to engage only the larger of the top flaps after separation, the said first electro-mechanical means being electrically connected to the clutch and adapted to disengage the clutch upon actuation of said means by the larger flap,
(*j*) a pair of opposed, cammed guide arms mounted on the frame adapted to engage the respective top flaps after separation, folding them first upwardly, then outwardly and finally downwardly,
(*k*) a second electro-mechanical detection and switch means mounted on the frame adapted to engage the smaller of the top flaps only if it has first been engaged by one of the cammed guide arms,
(*l*) a third electro-mechanical detection and switch means positioned to engage a side wall of the carton, the second and third electro-mechanical means being electrically connected to each other and the clutch so that the third said means will disengage the clutch if the second said means has not first been actuated by the smaller flap, and
(*m*) the cartons being carried by the drive means to a stamping machine.

2. A carton handling device comprising,
(*a*) the structure in accordance with claim 1, and
(*b*) a vertically adjustable, longitudinal carton guide on the opposite side of the stamping machine,
(*c*) carton closure and sealing means adapted to operatively engage each carton as it passes through the longitudinal carton guide, and
(*d*) carton ejector means at the end of the longitudinal guide opposite the stamping machine adapted to engage each carton as it leaves the longitudinal guide, transporting it to a receiving area.

3. A carton handling device comprising,
(*a*) the structure in accordance with claim 1, in which,
(*b*) the carton drive means momentarily disengages each carton as it enters the stamping machine.

4. A carton handling device comprising,
(*a*) a first power source,
(*b*) a transmission connected to the first power source,
(*c*) an electrically controlled clutch in the transmission adapted to instantaneously disengage the transmission from the first power source, (*d*) a pair of rotatable sprockets at least one of which is driven through the transmission, (*e*) a generally horizontal endless chain mounted on and revolving about the sprockets, the chain extending in carton intercepting relationship to the carton transport means, (*f*) a plurality of pairs of carriers connected to the chain, (*g*) a carton pusher pivotally mounted at one end to one carrier of each pair of carriers, (*h*) a connecting arm pivotally connected between the opposite end of each pusher and the other carrier of the pair of carriers, (*i*) a generally horizontal, vertically adjustable frame mounted over the chain, (*j*) means for inwardly compressing the side walls of each carton as it is being carried by the chain, (*k*) carton opening means mounted on the frame extending downwardly into the path of movement of the cartons carried by the chain and adapted to insert beneath the top flaps of the carton while the side walls are being compressed, thereby separating the top flaps, (*l*) a first electro-mechanical detection and switch means mounted on the frame adapted to engage only the larger of the top flaps after separation, the said first electro-mechanical means being electrically connected to the clutch and adapted to disengage the clutch upon actuation of said means by the larger flap, (*m*) a pair of opposed, cammed guide arms mounted on the frame adapted to engage the respective top flaps after separation, folding them first upwardly, then outwardly and finally downwardly, (*n*) a second electro-mechanical detection and switch means mounted on the frame adapted to engage the smaller of the top flaps only when it has been first engaged by one of the cammed guide arms, (*o*) a third electro-mechanical detection and switch means positioned to engage a side wall of the carton, the second and third electro-mechanical means being electrically connected to each other and the clutch so that the third said means will disengage the clutch if the second said means has not first been actuated by the smaller flap, and (*p*) the cartons being carried by the chain to a stamping machine.

References Cited in the file of this patent

UNITED STATES PATENTS 3,068,622 Brownlee ---------------- Dec. 18, 1962